(12) United States Patent
Sundström et al.

(10) Patent No.: US 12,183,989 B2
(45) Date of Patent: Dec. 31, 2024

(54) BEAMFORMING METHOD AND APPARATUS

(71) Applicant: Telefonaktiebolaget LM Ericsson (publ), Stockholm (SE)

(72) Inventors: Lars Sundström, Lund (SE); Henrik Sjöland, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 3 days.

(21) Appl. No.: 18/015,670

(22) PCT Filed: Jul. 22, 2020

(86) PCT No.: PCT/EP2020/070662
§ 371 (c)(1),
(2) Date: Jan. 11, 2023

(87) PCT Pub. No.: WO2022/017597
PCT Pub. Date: Jan. 27, 2022

(65) Prior Publication Data
US 2023/0253704 A1    Aug. 10, 2023

(51) Int. Cl.
*H04B 7/02* (2018.01)
*H01Q 3/38* (2006.01)
*H04B 7/06* (2006.01)

(52) U.S. Cl.
CPC ............. *H01Q 3/38* (2013.01); *H04B 7/0617* (2013.01)

(58) Field of Classification Search
CPC ................ H01Q 3/38; H04B 7/0617
(Continued)

(56) References Cited

U.S. PATENT DOCUMENTS 9,923,270 B1    3/2018 Little et al.
2003/0184473 A1   10/2003 Yu
(Continued)

FOREIGN PATENT DOCUMENTS

| CN | 1855760 A | | 11/2006 |
|---|---|---|---|
| JP | H07107023 | * | 4/1995 |
| JP | 2012054793 A | | 3/2012 |

OTHER PUBLICATIONS

Cohen, et al., "A bidirectional TX/RX four element phased-array at 60GHz with RF-IF conversion block in 90nm CMOS process", 2009 IEEE Radio Frequency Integrated Circuits Symposium, Boston, MA, 2009, pp. 207-210.
(Continued)

*Primary Examiner* — Helene E Tayong
(74) *Attorney, Agent, or Firm* — Murphy, Bilak & Homiller, PLLC

(57) ABSTRACT

A beamforming apparatus (10) performs beamforming via a plurality of antenna elements (12) by using per-branch sign reversal circuits (16) that approximate the per-branch phase values associated with a particular beam direction or shape by selectively reversing or not reversing the polarities of the individual branch signals (18). Eliminating continuous-valued or high-resolution phasing control from the branch circuits (14) that are fed into or from the respective antenna elements (12) simplifies the branch circuitry, thereby reducing the physical space needed for the branch circuits (14) and reducing loss and noise within the branch circuits (14). Further, operating the plurality of antenna elements (12) as two or more groups (24) and controlling the differential phase between the groups (24) advantageously reduces the errors arising from the approximation of the per-branch phase values.

23 Claims, 14 Drawing Sheets

(58) Field of Classification Search
USPC .......................................................... 375/267
See application file for complete search history.

(56) References Cited

U.S. PATENT DOCUMENTS

| | | |
|---|---|---|
| 2017/0366242 A1 | 12/2017 | Lee et al. |
| 2018/0048063 A1 | 2/2018 | Hallivuori |
| 2019/0393948 A1 | 12/2019 | Zhao et al. |
| 2022/0060200 A1* | 2/2022 | Mohammadi .......... H03H 11/20 |
| 2023/0369758 A1* | 11/2023 | Wang ................... H04B 7/0604 |

OTHER PUBLICATIONS

Poon, et al., "Supporting and Enabling Circuits for Antenna Arrays in Wireless Communications", in Proceedings of the IEEE, vol. 100, No. 7, Jul. 2012, pp. 2207-2218.

* cited by examiner

"a" DENOTES ANTENNA ELEMENTS 12 THAT BELONG TO A FIRST GROUP "a" OF ANTENNA ELEMENTS
"b" DENOTES ANTENNA ELEMENTS 12 THAT BELONG TO A SECOND GROUP "b" OF ANTENNA ELEMENTS

BEAMFORMING METHOD AND APPARATUS

TECHNICAL FIELD

The present disclosure relates to beamforming radio signals via a plurality of antenna elements.

BACKGROUND

Increasing use of Gigahertz (GHz) frequencies, including millimeter wave (mmW) frequencies, in wireless communication networks motivates the accompanying use of beamforming, to compensate for the increasing path losses occurring with higher signal frequencies. Fifth Generation (5G) communication networks under development by the Third Generation Partnership Project (3GPP) stand as one example of the move to higher signal frequencies, while the next, Sixth Generation (6G) of wireless communication networks is expected to support carrier frequencies in excess of 100 GHz.

"Beamforming" in the radio-signal context is a spatial filtering technique used for directional transmission or reception of radio signals. One approach to controlling the shape or directionality of the antenna gain exhibited by an array of antenna elements involves phase-shifting the branch signals fed into or from the individual antenna elements, so the signals transmitted or received in a particular direction are in phase. Conventional approaches to phasing the branch signals in the analog domain apply the per-branch phase values computed for the particular beam direction or shape to be realized, with the per-branch phasing control relying on passive reactive components, including lumped components such as inductors, capacitors, and further including distributed circuit blocks like couplers and transmission lines.

SUMMARY

A beamforming apparatus performs beamforming via a plurality of antenna elements by using per-branch sign reversal circuits that approximate the per-branch phase values associated with a particular beam direction or shape by selectively reversing or not reversing the polarities of the individual branch signals. Eliminating continuous-valued or high-resolution phasing control from the branch circuits that are fed into or from the respective antenna elements simplifies the branch circuitry, thereby reducing the physical space needed for the branch circuits and reducing loss and noise within the branch circuits. Further, operating the plurality of antenna elements as two or more groups and controlling the differential phase between the groups advantageously reduces the errors arising from the approximation of the per-branch phase values.

An example embodiment comprises a beamforming apparatus that is configured for beamforming of radio signals using a plurality of antenna elements. The beamforming apparatus includes a plurality of branch circuits. Each branch circuit is associated with a respective one of the antenna elements and includes a sign reversal circuit that is controllable to reverse or not reverse the polarity of a branch signal conveyed by the branch circuit. Further included are one or more phase shifters that are controllable to impart a differential phase shift between two or more group signals comprising at least first and second group signals. Each group signal corresponds to a respective antenna element group within the plurality of antenna elements and is combined from or split into the branch circuits associated with the respective antenna element group. Still further, the example apparatus includes control circuitry that is configured to perform the beamforming by controlling the one or more phase shifters jointly with controlling the sign reversal circuits in the branch circuits associated with the respective antenna element groups.

Another example embodiment comprises a method of beamforming radio signals using a plurality of antenna elements. The method includes operating the plurality of antenna elements as two or more antenna element groups, where each antenna element is associated with a corresponding branch circuit that includes a sign reversal circuit that is controllable to reverse or not reverse the polarity of a branch signal conveyed by the branch circuit. Further, the method includes controlling a differential phase shift between group signals corresponding to the two or more antenna element groups jointly with controlling the sign reversal circuits, to perform the beamforming.

Of course, the present invention is not limited to the above features and advantages. Indeed, those skilled in the art will recognize additional features and advantages upon reading the following detailed description, and upon viewing the accompanying drawings.

DETAILED DESCRIPTION

Example circuits and apparatus disclosed herein embody a beamforming architecture having reduced complexity, where the individual branch circuits corresponding to respective antenna elements in a plurality of antenna elements used for beamforming selectively reverse the polarity of the branch signals that are fed into or from the antenna elements. Selective polarity reversal can be understood as an extreme quantization of the per branch phase values used in conventional phase-based beamforming, wherein the contemplated architecture provides one of two phase settings for each branch signal, e.g., either 0 or 180 degrees.

However, quantizing the per-branch phase shifts into one of two settings—reversed polarity or not reversed polarity—introduces an approximation error and the contemplated architecture involves operating the plurality of antenna elements as two or more groups of antenna elements with the controlled imposition of a differential phase between the groups, to reduce the approximation errors. While the phase-shifting used to introduce the differential phase shift between the groups may be continuous or high resolution, there are far fewer groups of antenna elements than there are antenna elements involved in the beamforming.

Further, in at least some embodiments of a beamforming apparatus contemplated herein, the individual branch circuits that feed into or are fed by the respective antenna elements are differential branch circuits having positive and negative signal paths—i.e., the branch signals are differential. Controlling polarity reversal for the branch signal carried by a branch circuit therefore comes almost for "free," simply by introducing a set of switches into each branch circuit that provides for selective reversal of the positive and negative connections of the positive and negative signal paths.

Figure 1:
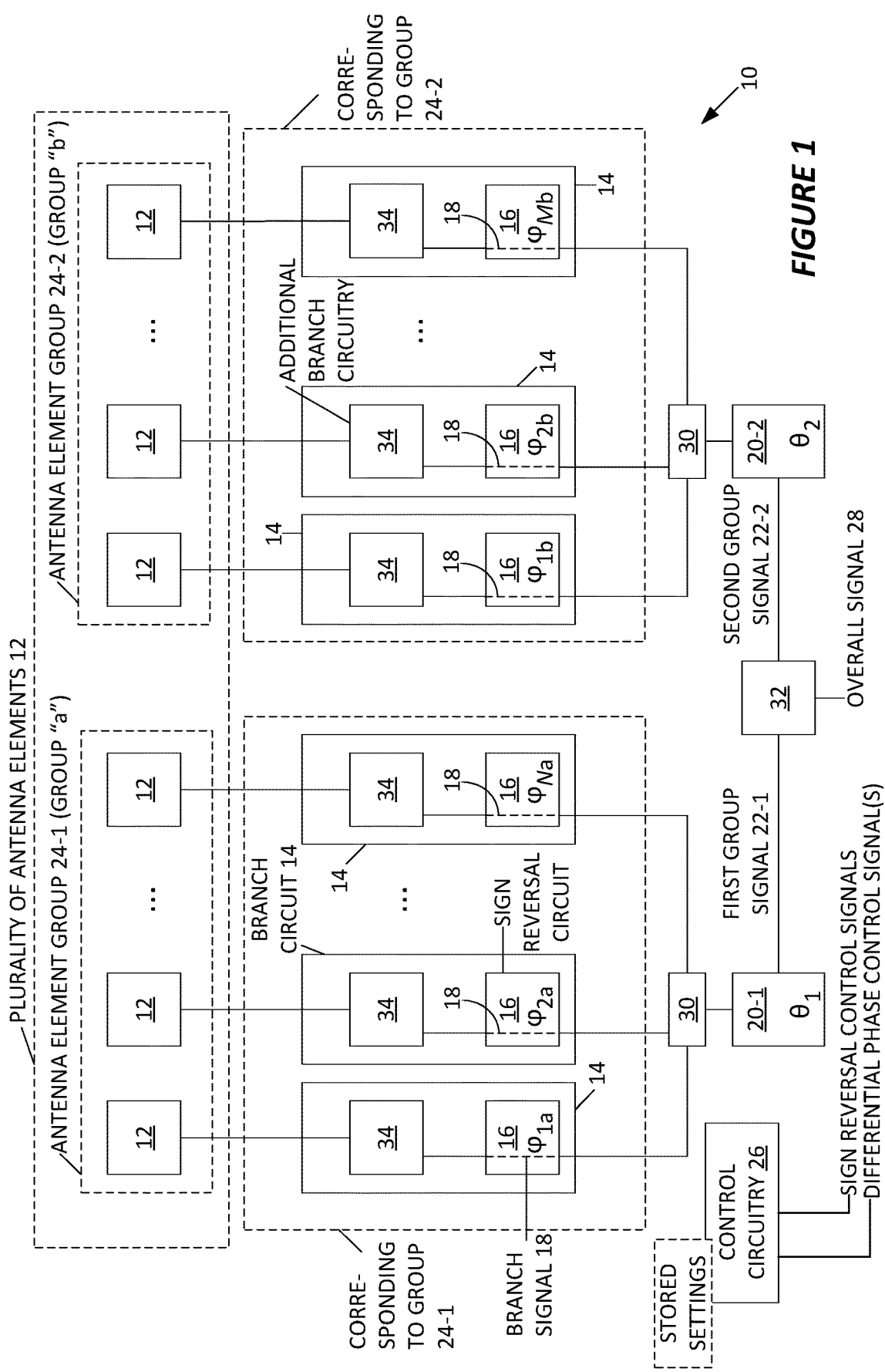
FIG. 1 is a block diagram of one embodiment of a beamforming apparatus.

FIG. 1 depicts an example beamforming apparatus 10, with the beamforming apparatus shown in association with a plurality of antenna elements 12, e.g., a one- or two-dimensional array of antenna elements 12. The beamforming apparatus 10 may be integrated or otherwise packaged with the plurality of antenna elements 12 or may be provided separately from the plurality of antenna elements 12.

The beamforming apparatus 10 is configured for beamforming of radio signals using a plurality of antenna elements 12 and it includes a plurality of branch circuits 14. Each branch circuit 14 is associated with a respective one of the antenna elements 12 and includes a sign reversal circuit 16 that is controllable to reverse or not reverse the polarity of a branch signal 18 conveyed by the branch circuit 14. Note that each branch circuit 14 may be understood as including a receive signal path and/or a transmit signal path, such that the "signal" conveyed by or through the path changes along the path, e.g., as a consequence of amplification, filtering, etc. However, at the point in each branch circuit 14 where the sign reversal circuit 16 included in that branch operates on the path signal, the path signal may be understood as the "branch signal 18". That is, the sign reversal circuit 16 of each branch circuit 14 is operative to reverse the polarity of the branch signal 18 conveyed in that branch, on a selective basis in response to a control setting or value.

One or more phase shifters 20 are controllable to impart a differential phase shift between two or more group signals 22 comprising at least first and second group signals 22-1, 22-2. Each group signal 22 corresponds to a respective antenna element group 24 within the plurality of antenna elements 12 and is combined from or split into the branch circuits 14 associated with the respective antenna element group 24.

Control circuitry 26 of the beamforming apparatus 10 is configured to perform the beamforming by controlling the one or more phase shifters 20 jointly with controlling the sign reversal circuits 16 in the branch circuits 14 associated with the respective antenna element groups 24. For example, in at least one embodiment of the beamforming apparatus 10, the beamforming apparatus 10 stores predetermined control settings for the sign reversal circuits 16 and the one or more phase shifters 20, for each of one or more beam directions to be effectuated.

In one or more example implementations, the respective antenna element groups 24 are disjoint subsets in the plurality of antenna elements 12. The control circuitry 26 in an example embodiment is configured to alter a group membership or a group size for one or more of the respective antenna element groups 24, to increase an antenna array gain or suppress sidelobes for a desired beam direction.

For any defined beam direction and/or beam shape to be effectuated, the control circuitry 26 in at least one embodiment is configured to control any one or more of: a group configuration of any one or more of the respective antenna element groups 24, settings for the sign reversal circuits 16, settings for the one or more phase shifters 20, and settings for a common phase value used on a per group basis for each antenna element group 24. Here, the common phase value introduces a common bias into the individual polarity reversal decisions made with respect to the individual branch circuits 14 included in each antenna element group 24.

"Controlling" the group configuration for any one or more of the respective antenna element groups 24 comprises changing the group membership for any one or more of the respective antenna group elements 24. A membership change for an antenna element group 24 means changing which antenna elements 12 belong to the group. A membership change may increase or decrease the number of antenna elements 12 included in the group or may leave the number unchanged while changing which particular ones of the antenna elements 12 are included in the group.

Further, the control circuitry 26 in one or more embodiments is configured to form the respective antenna element groups 24 dynamically.

For a particular beam direction to be effectuated by the beamforming apparatus 10 via the plurality of antenna elements 12, there exists a set of ideal phase shifts for the branch circuits 14. Correspondingly, the control settings used by the control circuitry 26 for the sign reversal circuits 16 in the associated branch circuits 14 approximate the ideal phase shifts by, for each respective antenna element group 24, controlling the sign reversal circuit 16 in each associated branch circuit 14 to reverse or not reverse the polarity of the associated branch signal 18 in dependence on the value of the corresponding ideal phase shift. In one or more embodiments, a common phase shift is applied to the ideal phase shifts, to reduce the errors associated with approximating the ideal phase shifts discretely via the sign reversal circuits 16. Further, in one or more embodiments of the beamforming apparatus 10, the control circuitry 26 is configured to control the one or more phase shifters 20 to compensate for a reduced antenna array gain arising from the approximation.

Consider an example implementation of the beamforming apparatus, wherein, for each respective antenna element group 24, the control circuitry 26 determines whether to reverse or not reverse the polarity of each associated branch signal 18 according to the value of a discretized phase shift $\varphi_n$, where $$\varphi_n = 180 \cdot \left\lfloor \frac{(\varphi_{n,ideal} + \theta_c + 90) \bmod 360}{180} \right\rfloor,$$

where n denotes the n-th branch circuit 14 of the respective antenna element group 24, $\varphi_{n,ideal}$ is the ideal phase shift of the n-th branch circuit 14, $\theta_c$ is a group-specific common phase shift and $$\left\lfloor \frac{(\varphi_{n,ideal} + \theta_c + 90) \bmod 360}{180} \right\rfloor$$

equals 0 or 1 in dependence on the value of the ideal phase shift $\varphi_{n,ideal}$.

To better understand the foregoing operations, the two or more group signals 22 correspond to an overall signal 28. In a receive beamforming case, an element 30 combines the branch signals 18 for a respective one of the antenna element groups 24, to form a respective one of the group signals 22. After application of the differential phase to the group signals 22 by the one or more phase shifters, an element 32 combines the group signals 22 to form the overall signal 28. In transmit beamforming case, the overall signal 28 is a signal to be transmitted and the element 32 splits it into the respective group signals 22, which then pass through the one or more phase shifters 20, for application of the differential phase. The element 30 corresponding to each antenna element group 24 splits the corresponding group signal 22 into the respective branch signals 18, for conveyance via the respective branch circuits 14.

In addition to each branch circuit 14 including one of the sign reversal circuits 16, each branch circuit 14 includes additional branch circuitry 34. The nature of the additional branch circuitry 34 comprises, for example, one or more amplifiers, filters, etc. At least some of the branch circuitry 34 may be bidirectional and shared between the transmit (TX) and receive (RX) directions.

Figure 2:
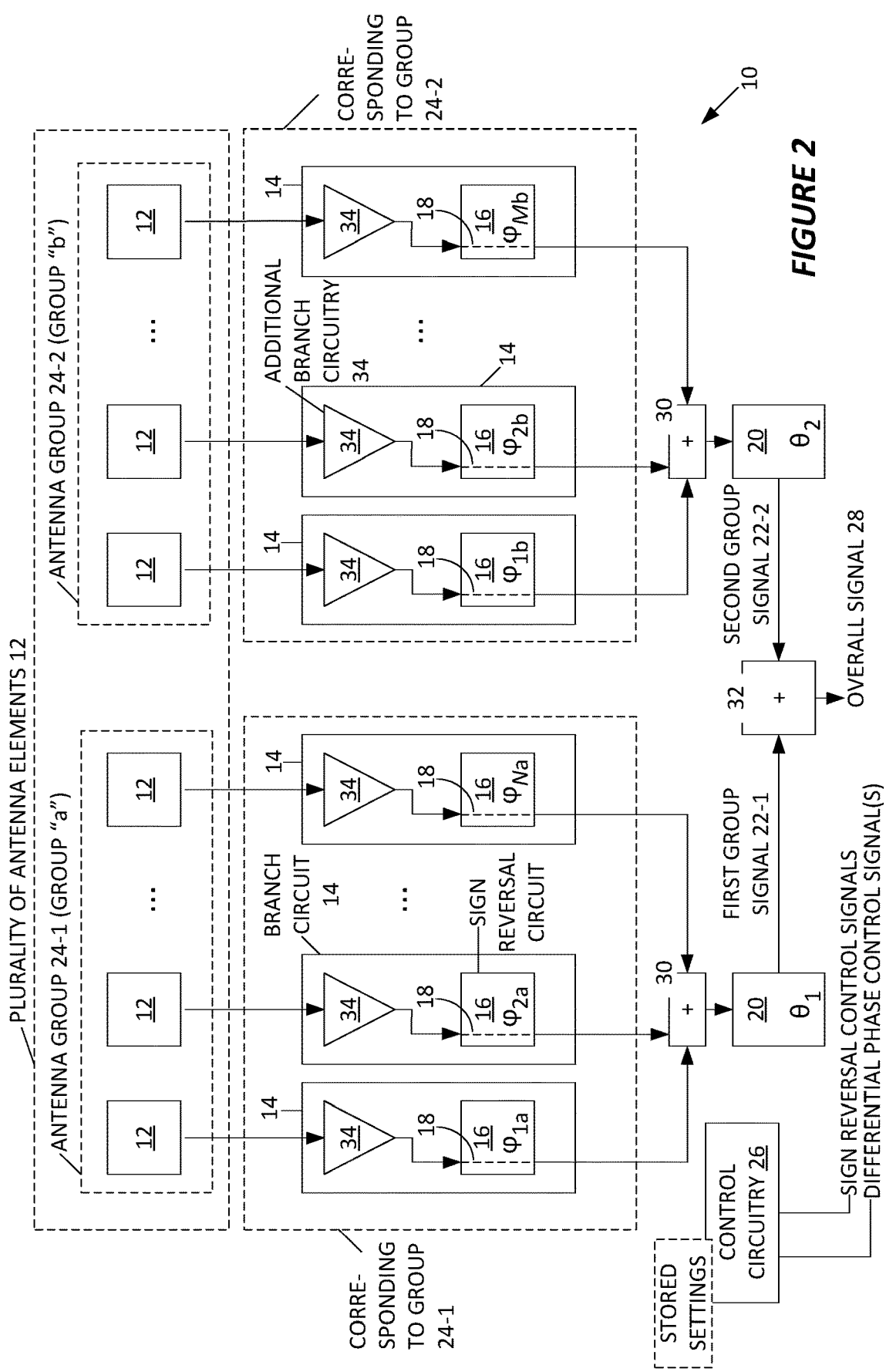
FIG. 2 is a block diagram of example details for reception beamforming in the context of the beamforming apparatus of FIG. 1.

FIG. 2 illustrates a receive-beamforming example, where the additional branch circuitry 34 per branch circuit 14 includes one or more amplifiers for received-signal amplification of the incoming radio signal as received on each of the respective antennal elements. Of course, the additional branch circuitry 34 may include filters, multiple stages of amplification, mixers for frequency conversion (down mixing), etc. In the receive case of FIG. 2, the element 30 corresponding to each antenna element group 24 is a signal combiner that combines the respective branch signals 18 of the antenna element group 24, and the element 32 is a signal combiner that combines the group signals 22 into the overall signal 28.

Additional circuitry, such as baseband processing circuitry, not depicted in FIG. 2 processes the overall signal 28 for reception processing. Such processing occurs, for example, in the digital domain rather than in the analog domain, e.g., based on digitizing the group signals 22 and forming the overall signal 28 in the digital domain, or by combining the group signals 22 in the analog domain and then digitizing. Correspondingly, while FIGS. 1 and 2 do not show miscellaneous supporting circuitry that may be included, in at least one embodiment of FIGS. 1 and 2, the one or more phase shifters 20 are digital-domain phase shifters that operate on the group signals 22 in the digital domain.

Figure 3:
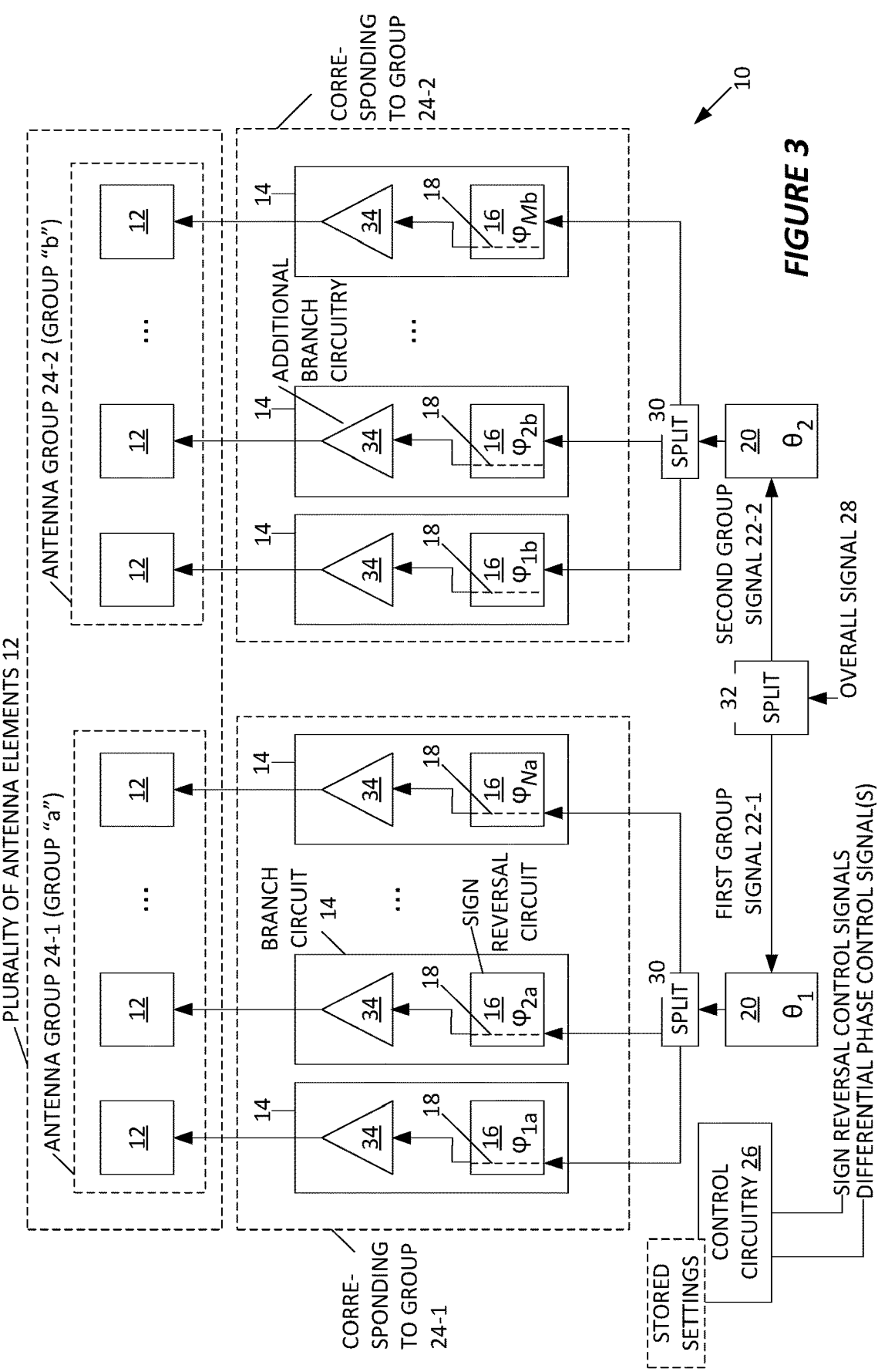
FIG. 3 is a block diagram of example details for transmission beamforming in the context of the beamforming apparatus of FIG. 1.

FIG. 3 illustrates a transmit beamforming example, where the overall signal 28 is a signal to be transmitted and where the element 32 operates as a signal splitter by splitting the overall signal 28 into the respective group signals 22. The one or more phase shifters 20 impart a differential phase between the group signals 22, and the element 30 associated with each antenna element group 24 splits the group signal 22 for that antenna element group 24 into the respective branch signals 18, with each branch signal 18 having its polarity selectively reversed or not reversed by the sign reversal circuit 16 included in each branch circuit 14. Thus, in a case of receive beamforming by the beamforming apparatus 10, each group signal 22 corresponds to a combination of branch signals 18 from the associated antenna element group 24, and, in a case of transmit beamforming by the beamforming apparatus 10, each group signal 22 is split to form the branch signals 18 for the associated antenna element group 24.

Figure 4A:
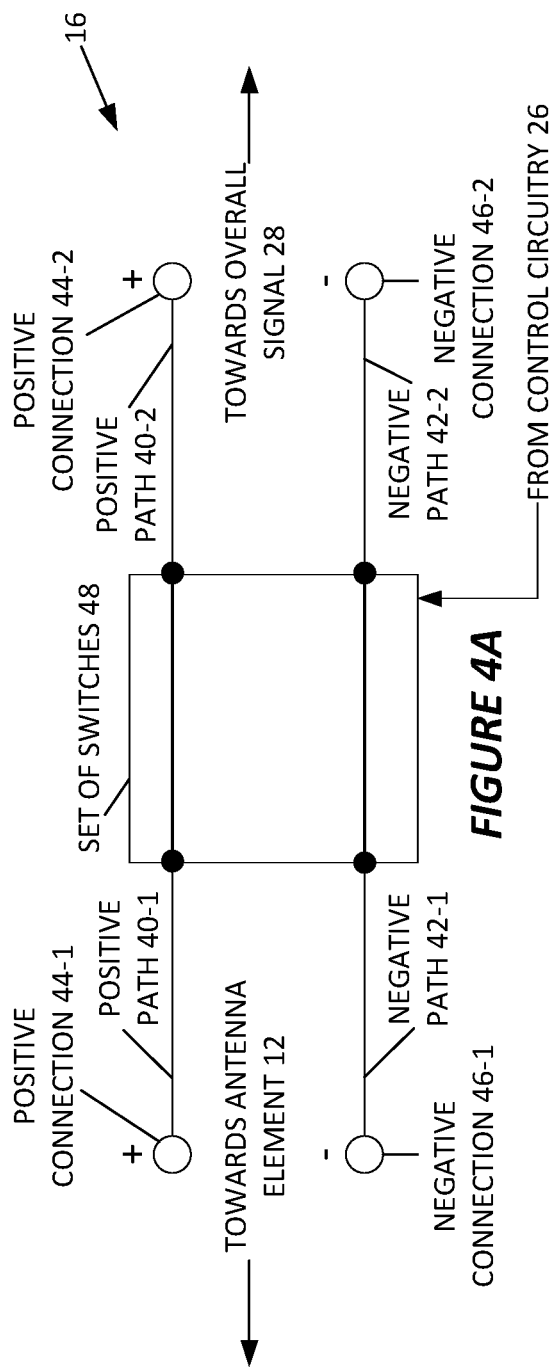
FIGS. 4A and 4B are block diagrams of one embodiment of a sign reversal circuit, for use in individual branch circuits of a beamforming apparatus, such as the one introduced in FIG. 1.

Regardless of whether operating in a transmit case or in a receive case, in at least one embodiment of the beamforming apparatus 10, each branch circuit 14 is a differential branch circuit having complementary positive and negative signal paths and implementation of the sign reversal circuits 16 exploits the differential nature of the branch circuits 14. FIG. 4A, for example, depicts one embodiment of the sign reversal circuit 16 used in each branch circuit 14.

The depicted sign reversal circuit 16 has complementary positive and negative signal paths 40 and 42, with the paths facing towards the antenna element labeled as positive path 40-1 and negative path 42-1 and with the paths facing towards the overall signal 28 labeled as positive path 40-2 and negative path 42-2. The positive and negative signal paths have corresponding positive and negative path connections 44, 46, with the positive and negative connections facing the antenna element 12 labeled as positive connection 44-1 and the negative connection 46-1, and with the positive and negative connections facing overall signal 28 labeled as positive connection 44-2 and negative connection 46-2.

Figure 4B:
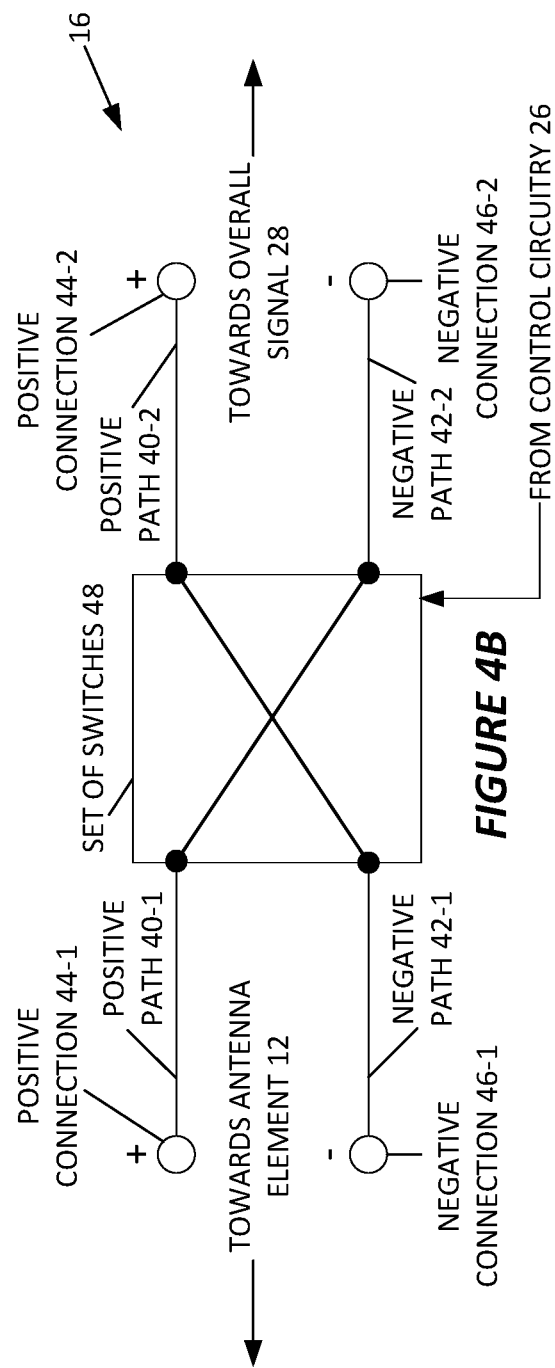

The sign reversal circuit 16 of each branch circuit 14 in the example comprises a set of switches 48 that are controllable to reverse the polarity of the corresponding branch signal 18 by reversing connectivity between the positive and negative path connections 44 and 46 with respect to the positive and negative signal paths 40 and 42. FIG. 4A shows the set of switches 48 in a first switch setting that does not reverse the polarity of the branch signal 18—i.e., the positive connection 44-1 connects to the positive connection 44-2 and the negative connection 46-1 connects to the negative connection 46-2. FIG. 4B, however, shows the set of switches 48 in a second switch setting that reverses the polarity of the branch signal 18—i.e., the positive connection 44-1 connects to the negative connection 46-2 and the negative connection 46-1 connects to the positive connection 44-2.

Implementing selective polarity control for each branch signal 18 using a respective set of switches 48 allows, for example, the use of inexpensive, small, and low-loss radiofrequency signal switches to approximate the ideal phase shift that in a conventional beamforming arrangement requires the use of more complex continuous-value or high-resolution phase shifters.

Figure 5:
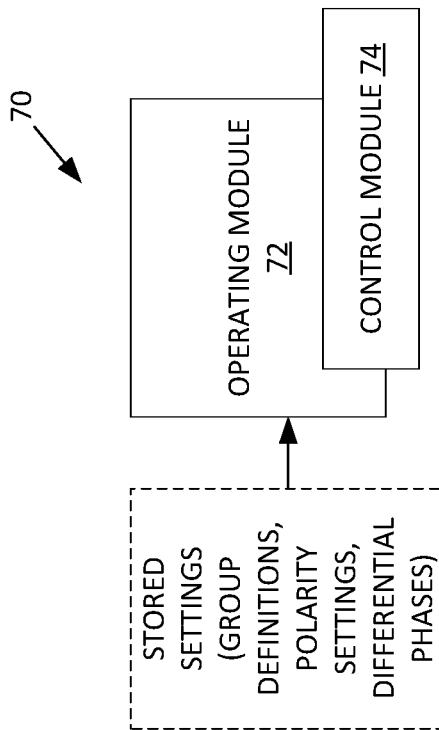
FIG. 5 is a block diagram of example details for implementing the control portion of a beamforming apparatus.

FIG. 5 illustrates an example implementation of the control circuitry 26 of the beamforming apparatus 10, where the control circuitry 26 comprises a number of processing units or modules 70. In one example, the modules 70 are implemented via the execution of stored computer program instructions by one or more processors, and they include an operating module 72 and an included or associated control module 74.

The operating module 72 is configured to operate a plurality of antenna elements 12 as two or more antenna element groups 24, with each antenna element group 24 having a corresponding group signal 22 that is combined from or split into a plurality of branch circuits 14 associated with the corresponding antenna element group 24. Each branch circuit 14 corresponds to a respective one of the antenna elements 12 and includes a sign reversal circuit 16 that is controllable to reverse or not reverse the polarity of a branch signal 18 conveyed by the branch circuit 14.

The control module 74 supports the operation of the plurality of antenna elements 12 as two or more antenna element groups 24 by controlling a differential phase shift between the group signals 22 jointly with controlling the plurality of sign reversal circuits 16, to perform the beamforming. For example, the operating module 72/control module 74 may use predetermined control settings for the sign reversal circuits 16, and for the one or more phase shifters 20 that are operative to impart the differential phase shift between the group signals 22, for each of one or more beam directions to be effectuated. Additionally, or alternatively, the operating module 72/control module 74 may alter a group membership or a group size for one or more of the respective antenna element groups 24, to increase an antenna array gain or suppress sidelobes for a desired beam direction.

Figure 6:
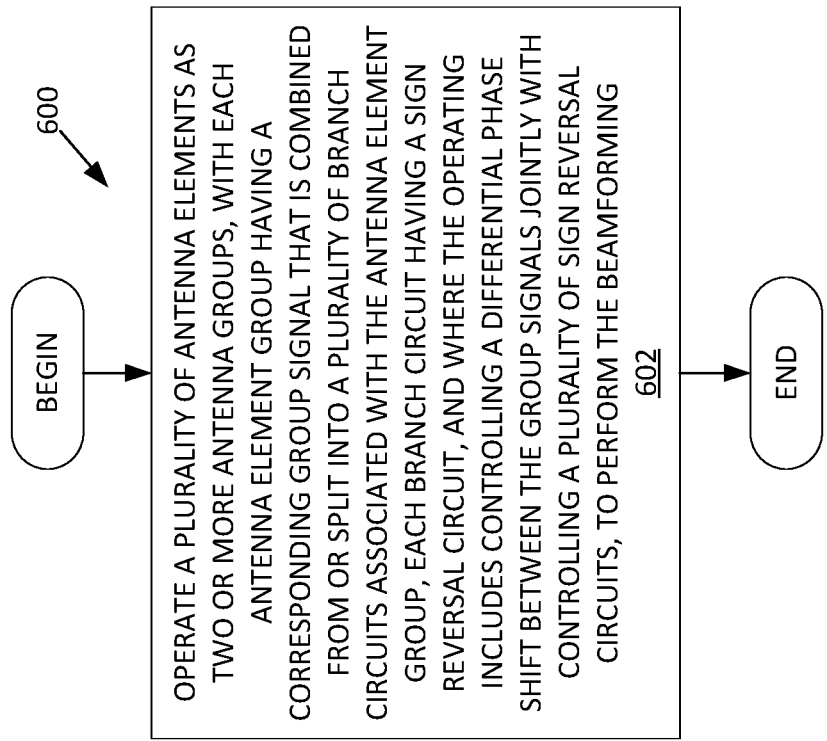
FIG. 6 is a logic flow diagram of one embodiment of a method of beamforming.

FIG. 6 illustrates as one example embodiment a method (600) of operation by a beamforming apparatus, such as the beamforming apparatus 10 introduced in FIG. 1. The method 600 includes operating (Block 602) a plurality of antenna elements 12 as two or more antenna element groups 24, with each antenna element group 24 having a corresponding group signal 22 that is combined from or split into a plurality of branch circuits 14 associated with the corresponding antenna element group 24.

Each branch circuit 14 corresponds to a respective one of the antenna elements 12 and includes a sign reversal circuit 16 that is controllable to reverse or not reverse the polarity of a branch signal 18 conveyed by the branch circuit 14. Correspondingly, the step of operating (Block 602) the plurality of antenna elements 12 as two or more antenna element groups 24 includes controlling a differential phase shift between the group signals 22 jointly with controlling the plurality of sign reversal circuits 16, to perform the beamforming.

The method 600 may further comprise using predetermined control settings for the sign reversal circuits 16 and one or more phase shifters 20 that are operative to impart the differential phase shift between the group signals 22, for each of one or more beam directions to be effectuated.

In at least one embodiment, for any defined beam direction and/or beam shape to be effectuated, the operating step (Block 602) of the method 600 comprises controlling any one or more of: a group configuration of any one or more of the respective antenna element groups 24, settings for the sign reversal circuits 16, and settings for the one or more phase shifters 20. The settings may be configured respectively or jointly for configuring the antenna gain according to the beam direction/shape being effectuated.

In at least one embodiment, the method 600 includes controlling the differential phase shift jointly with controlling the sign reversal circuits 16 for changing from one beam shape or direction to another, based on changing control settings that control the sign reversal circuits 16 and one or more phase shifters 20 that impart the differential phase shift(s). Additionally, or alternatively, the method 600 in one or more embodiments includes forming the respective antenna element groups (24) dynamically.

Further, the method 600 in at least one embodiment includes applying the differential phase shift in the digital domain.

For a particular beam direction to be effectuated, there exists a set of ideal phase shifts of the branch circuits 14. Controlling the differential phase shift between the group signals 22 corresponding to the two or more antenna element groups 24 jointly with controlling the sign reversal circuits 16 comprises approximating the ideal phase shifts. Approximating the ideal phase shifts comprises, for each respective antenna element group 24, controlling the sign reversal circuit 16 in each associated branch circuit 14 to reverse or not reverse the polarity of the associated branch signal 18 in dependence on the value of the corresponding ideal phase shift, as adjusted by a common phase shift that reduces an error associated with the approximation.

Such operations may further include using one or more phase shifters 20 that impart the differential phase shift between the group signals 22, to compensate for a reduced antenna array gain arising from the approximation. That is, with reference to "joint" control of the sign reversal circuits 16 and the one or more phase shifters 20, the sign reversal circuits 16 are used to approximate the ideal per-branch phase shifts that would be used for conventional beamforming from the plurality of antenna elements 12. Correspondingly, the one or more phase shifters are adjusted or otherwise controlled to impart a differential phase shift between the group signals 22 to a differential value or values that reduces the error arising from approximating the ideal per-branch phase shifts.

For each respective antenna element group 24, the method 600 in one or more embodiments includes determining whether to reverse or not reverse the sign (polarity) of each associated branch signal 18 according to the value of a discretized phase shift $\varphi_n$, where $$\varphi_n = 180 \cdot \left\lfloor \frac{(\varphi_{n,ideal} + \theta_c + 90) \bmod 360}{180} \right\rfloor,$$

where the numerical values represent degrees, n denotes the n-th branch circuit 14 of the respective antenna element group 24, $\varphi_{n,ideal}$ is the ideal phase shift of the n-th branch circuit 14, $\theta_c$ is a group-specific common phase shift and $$\left\lfloor \frac{(\varphi_{n,ideal} + \theta_c + 90) \bmod 360}{180} \right\rfloor$$

equals 0 or 1 in dependence on the value of the ideal phase shift $\varphi_{n,ideal}$.

In at least one embodiment, each branch circuit 14 is a differential branch circuit having complementary positive and negative signal paths 40, 42 and corresponding positive and negative path connections 44, 46, and the sign reversal circuit 16 of each branch circuit 14 comprises a set of switches 48 that are controllable to reverse the polarity of the corresponding branch signal 18 by reversing connectivity between the positive and negative path connections 44, 46 with respect to the positive and negative signal paths 40, 42. Here, controlling the plurality of sign reversal circuits 16 comprises controlling the sets of switches 48.

Figure 7:
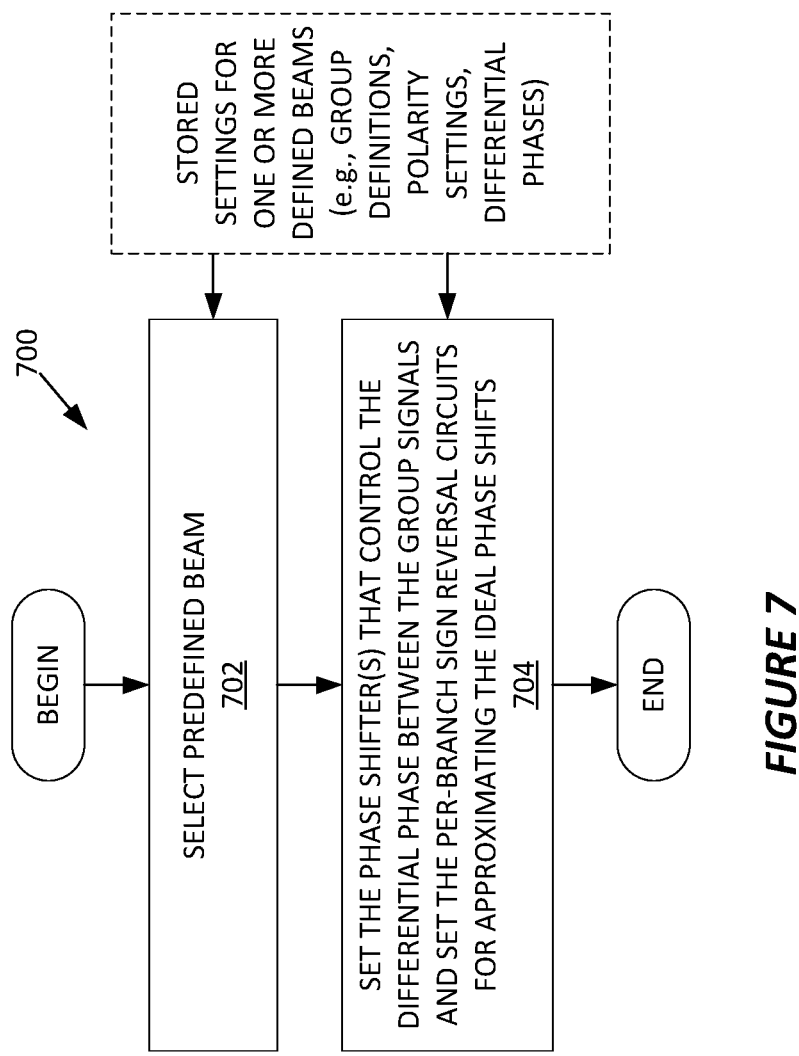
FIG. 7 is a logic flow diagram of another embodiment of a method of beamforming.

FIG. 7 depicts a method 700 of performing beamforming via a beamforming apparatus, such as the beamforming apparatus 10 introduced in FIG. 1. The method 700 may be understood as being subsumed in the method 600 or as being a more detailed variant of the method 600.

The method 700 includes selecting (Block 702) a predefined beam, e.g., from a plurality of predefined beams.

Here, the word "beam" refers to a particular radiation or gain pattern to be effectuated via the plurality of antenna elements 12. Different predefined beams correspond to different beam shapes or directions or both, and each predefined beam may be represented by a corresponding set of control values stored in or accessible to the control circuitry 26.

The control values in question are the control values for the phase shifter(s) 20 used to impart the differential phase between the two or more group signals 22, along with the control values for the per-branch sign reversal circuits 16, which may be referred to as the "polarity settings". Correspondingly, the method 700 includes setting (Block 704) the one or more phase shifters 20 and the sign reversal circuits 16. "Setting" for the one or more phase shifters 20 means setting the phase shifter(s) 20 to impart the differential phase defined for the selected beam—the "differential phase" may comprise one phase value or multiple phase values, in dependence on the number of antenna element groups 24 and whether there is one phase shifter 20 per antenna element group 24. "Setting" for the sign reversal circuits 16 means setting each sign reversal circuit 16 either to reverse the sign or not reverse the sign of the corresponding branch signal 18. "No reversal" may be a default setting such that active control is needed only for the reversal action.

The control values may implicitly or explicitly configure the membership of the antenna element groups 24 to be used for effectuating the selected beam, e.g., by indicating which branch circuits 14 belong to the same antenna element group 24. The control circuitry 26 uses, for example, a known mapping or identification scheme for mapping the set of polarity values that define the selected beam to the correct ones of the sign reversal circuits 16.

In case there are two group signals 22, there may be only one phase shifter 20 operating on only one of the group signals 22. However, having a phase shifter 20 per group may provide more flexibility or allow lower-resolution phase shifters to be used, and when there are more than two group signals 22, one or more additional phase shifters 20 are needed, for control of the differential phase between respective ones of the group signals 22. Further, for path uniformity, control resolution, etc., there may be advantages to including one phase shifter 20 for each group signal 22 and the beamforming apparatus 10 may include a predefined number of phase shifters 20 that limits the overall number of antenna element groups 24 that can be operated.

In one example of carrying out the method 700, the beamforming apparatus 10 performs repeated "beam sweeps" where, in each beam sweep, the beamforming apparatus activates each predefined beam in a set of predefined beams one at a time, either in a fixed order or a dynamically determined order. "Switching" from one beam to the next entails the control circuitry 26 of the beamforming apparatus changing the control settings of the one or more phase shifters 20 used to impart the differential phase between the group signals 22 jointly with changing the control settings of the sign reversal circuits 16.

One approach to determine the control settings for the sign reversal circuits 16 for a particular beam to be effectuated via the plurality of antenna elements 12 begins with calculating the ideal, non-discretized, phases $\varphi_{1,\ ideal} \ldots \varphi_{N,\ ideal}$. That is, the approach involves calculating the set of per-branch phase shifts that would be used to realize the desired beam using conventional phasing-based beamforming via the plurality of antenna elements 12. The ideal, non-discretized phases are then discretized to two possible phase values. Adding a common phase $\theta_c$ to the ideal phases before discretization offers an opportunity to reduce the error introduced by discretization.

Figure 8:
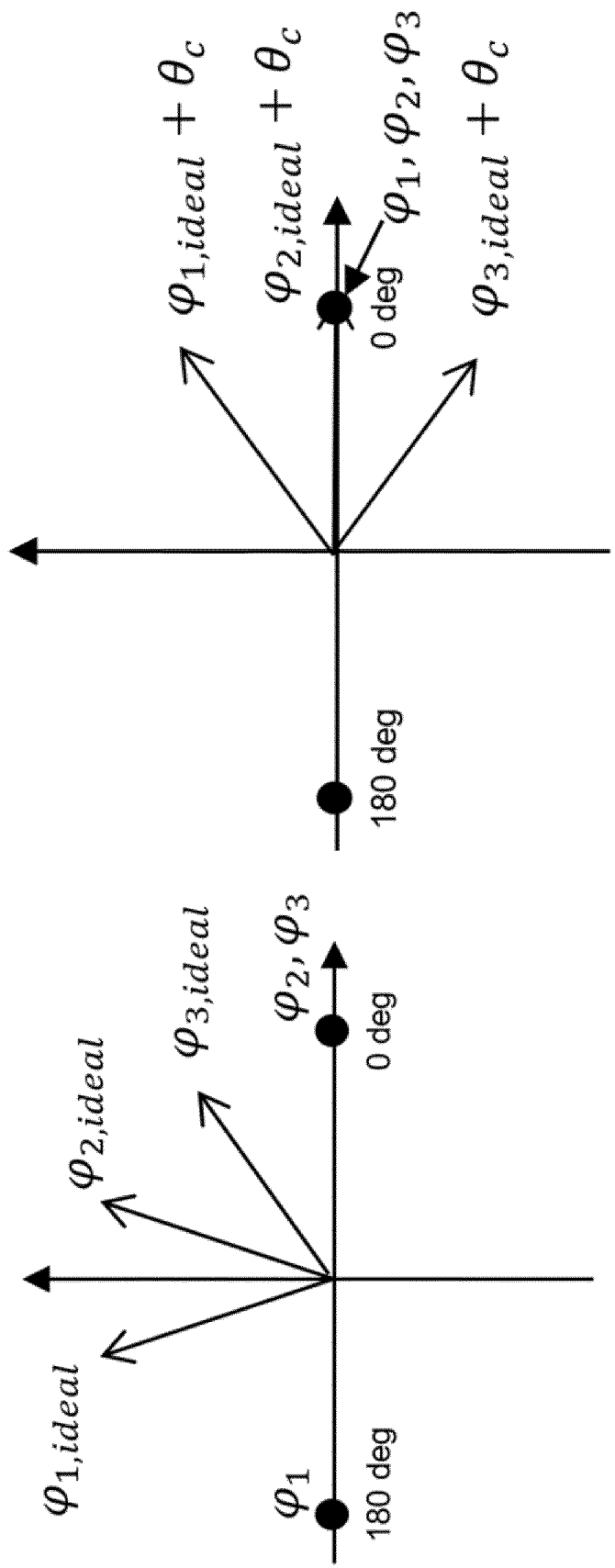
FIGS. 8A and 8B are plots of phase vectors illustrating one technique used for reducing errors arising from the approximation of beamforming phase shifts.

FIGS. 8A and 8B illustrate the foregoing approach but illustrate only three ideal phase shifts for ease of illustration, with each phase shift shown as a vector. An actual set of ideal phase shifts may include as many phase shifts as there are involved antenna elements 12.

FIG. 8A depicts the idealized phase shifts that are to be discretized into {0,180} degrees using rounding to nearest discrete value. When not adding a common phase $\theta_c$, the error becomes rather large but, as shown in FIG. 8B, with a suitably selected common phase $\theta_c$ the average error (across all phases) will be minimized. More formally the discretization may be calculated as $$\varphi_n = 180 \cdot \left\lfloor \frac{(\varphi_{n,ideal} + \theta_c + 90) \bmod 360}{180} \right\rfloor$$

where $\lfloor \cdot \rfloor$ denotes the floor function and a mod b denotes the modulo operation.

Note that adding the common phase $\theta_c$ shifts the ideal phases of the elements away from the desired phases. Thus, while adding the common phase $\theta_c$ minimizes the error due to discretization (approximation), the overall "situation" would not be improved by just adding the common phase $\theta_c$. However, the error introduced by adding the common phase can be compensated for by subtracting the common phase via the one or more phase shifters 20 used to impart the inter-group phase differential.

Another way to view these relations, for the combination of phase discretization and phase shifting of a group signal 22, the common phase $\theta_c$ is effectively added to both of the possible discretized phase values. Then in the discretization, for each branch circuit 14 the discretized phase value closest to the ideal one is chosen. By adjusting the discretized phase values using the common phase, they can be made closer to the target (ideal) phases, minimizing the errors due to discretization. With respect to the sign reversal circuits 16, the two discretized phase values can be understood as "polarity reversed" and "polarity not reversed".

The normalized group array gain for the plurality of antenna elements 12 may be calculated using the discretized phase values as (here the phases assumed to be in radians):

$$G_A = 1/N \left| \sum_{n=1}^{N} e^{j(\varphi_n - \varphi_{n,ideal})} \right|$$

which reaches a maximum value of unity when $\varphi_n - \varphi_{n,ideal}$ has the same value for all n.

In one or more embodiments, the stored settings used by the control circuitry comprise the polarity settings for the sign reversal circuits 16 in each antenna element group 24, for each of one or more defined beam directions and/or shapes, where the polarity settings for the branch circuits 14 in each antenna element group 24 represent the discretization of the ideal phase shifts, as compensated by a corresponding common phase value. The settings for different beam shapes and/or directions may be derived from or otherwise based on different common phase values.

Figure 9:
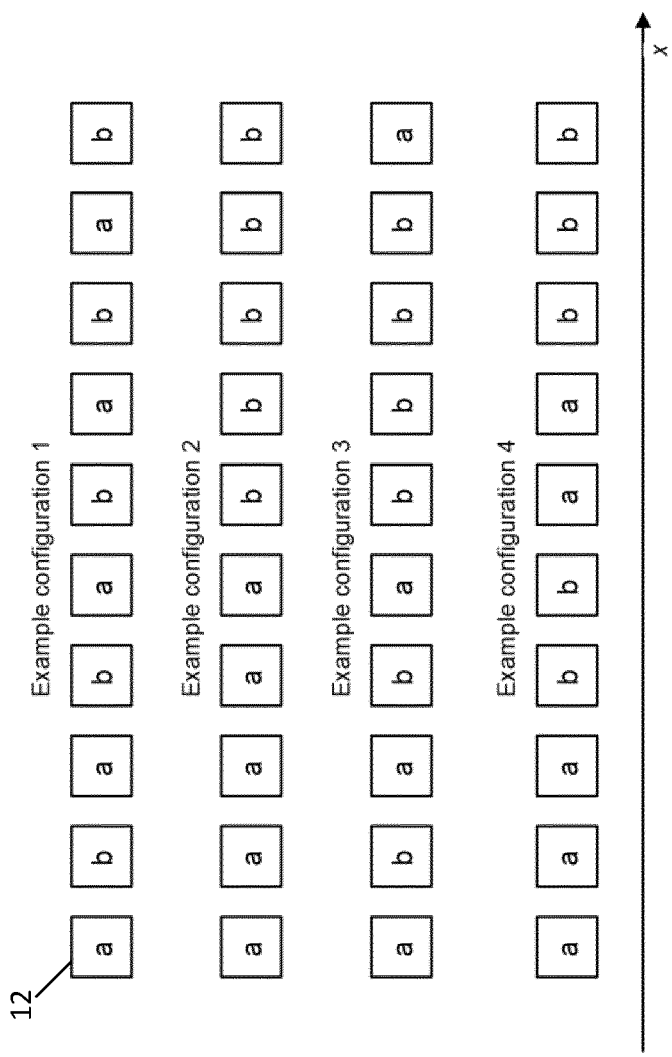
FIG. 9 is a block diagram of example configurations for antenna element groups that may be used by a beamforming apparatus, such as the beamforming apparatus of FIG. 1.
Figure 10:
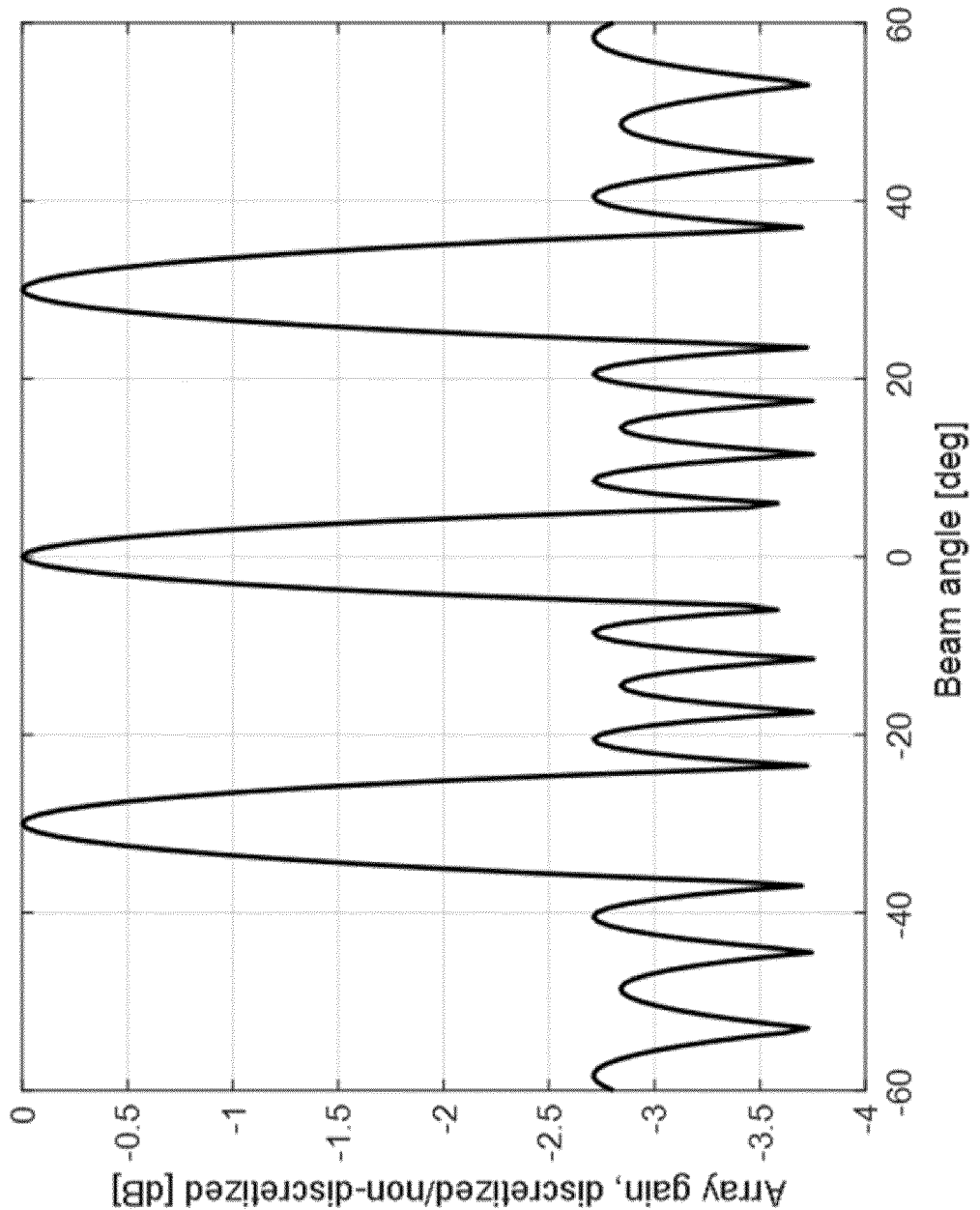
FIGS. 10-13 are plots illustrating antenna array gain versus beam angle, for the example antenna element groups of FIG. 9.
Figure 11:
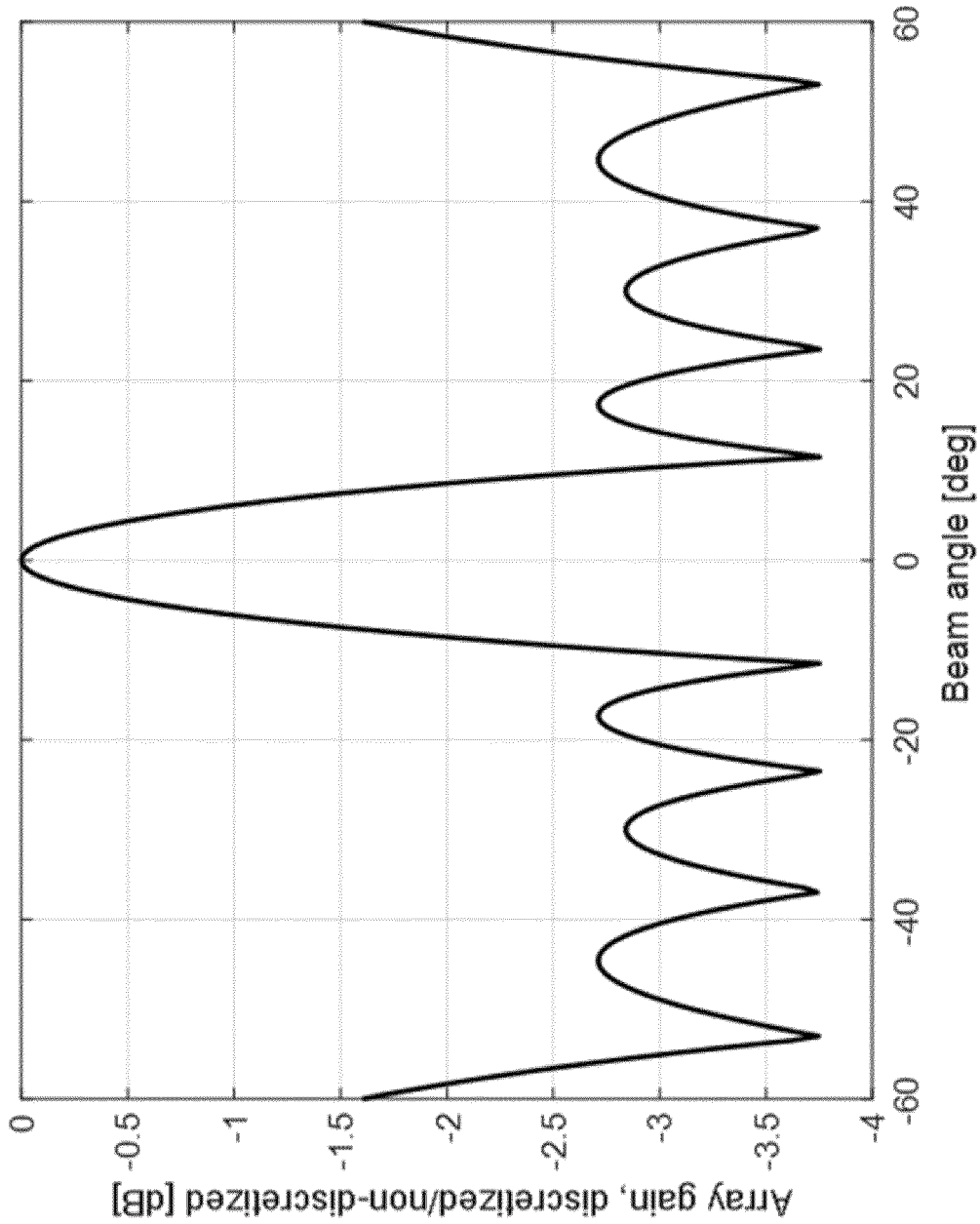
Figure 12:
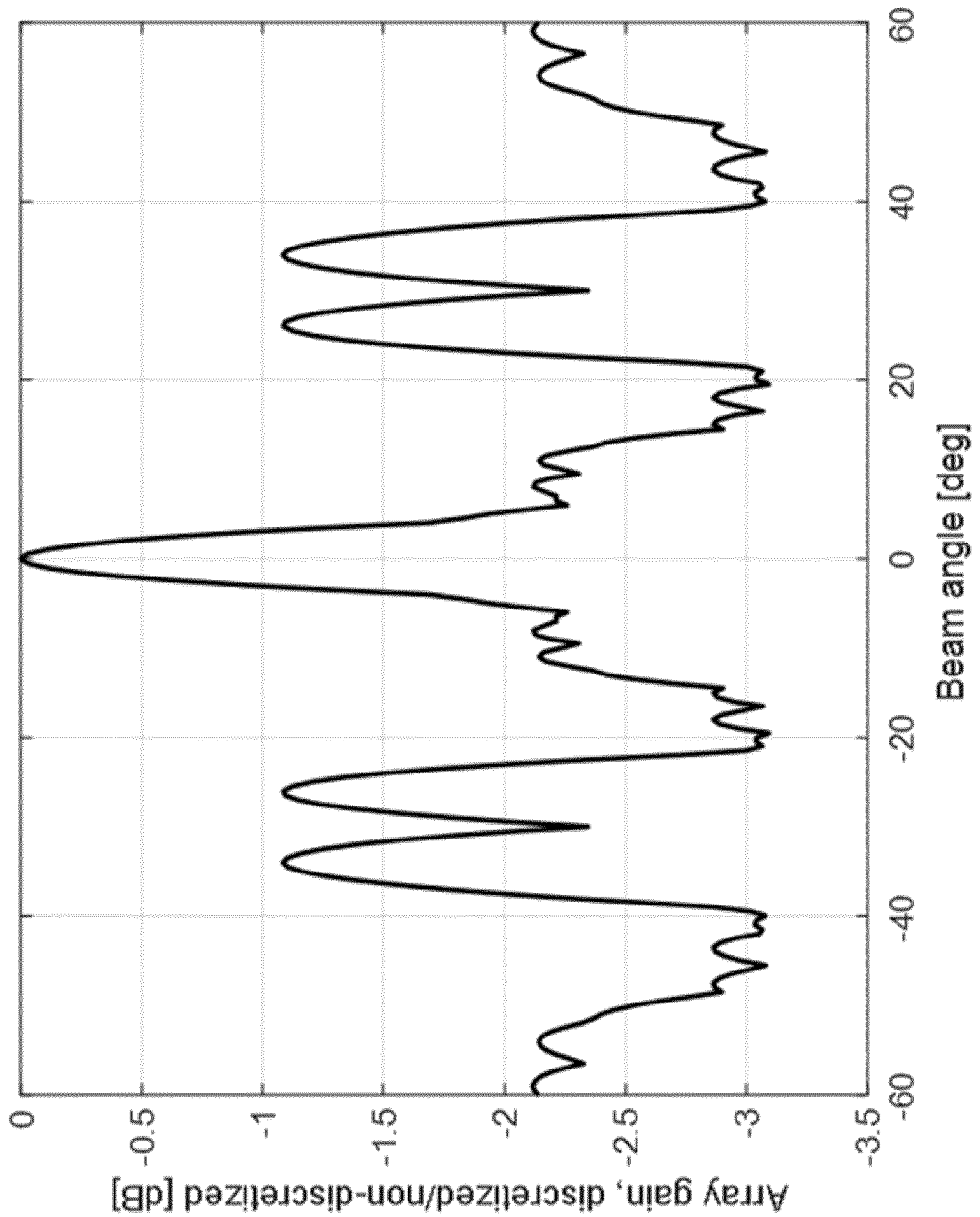
Figure 13:
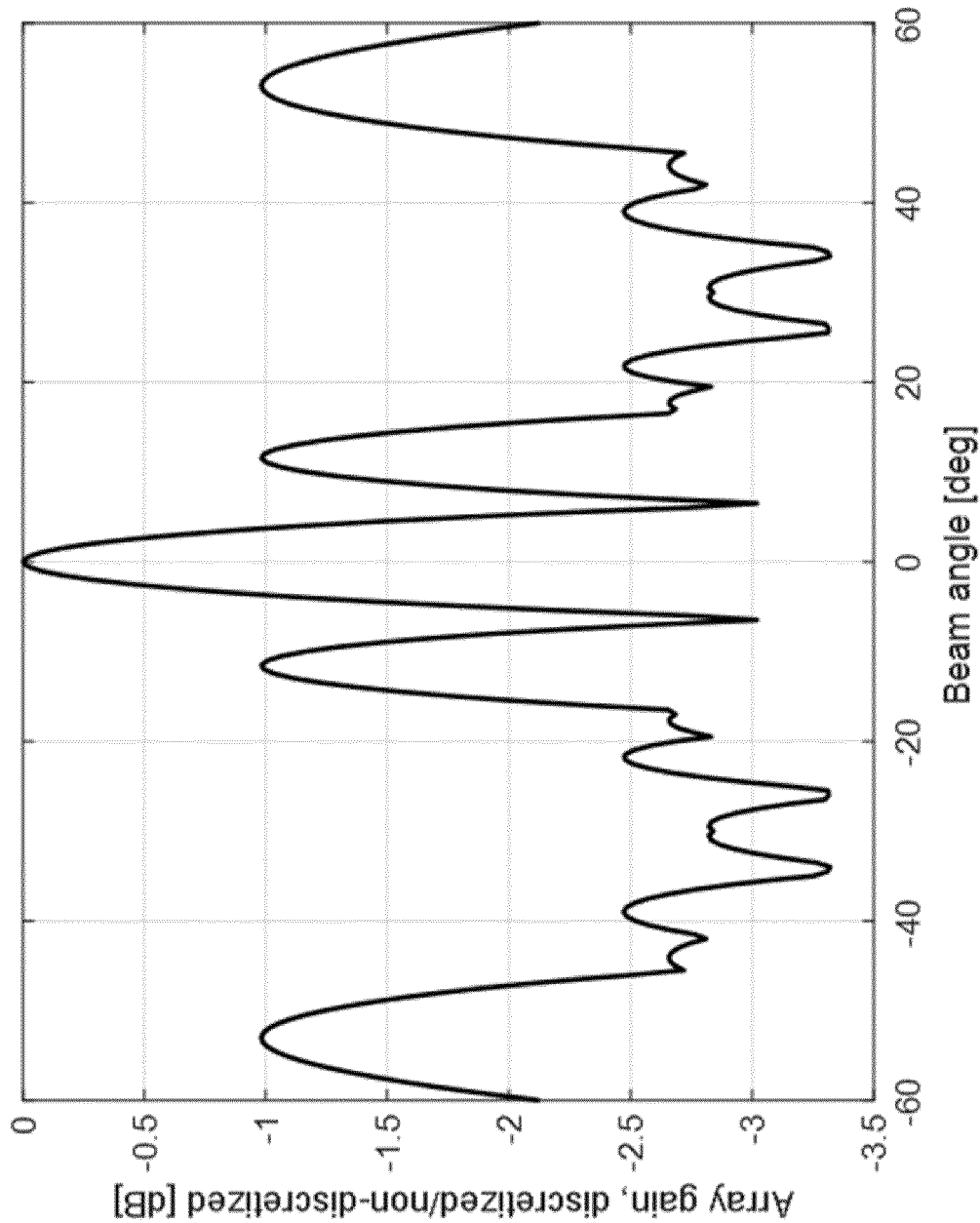

Now consider the four example group configurations shown in FIG. 9, where the antenna elements 12 labeled as "a" belong to a first one of two antenna element groups 24 and those labeled as "b" belong to a second one of the two antenna element groups 24.

Exploring the full configuration space for each desired beam angle may rely on a brute force search, for each example group configuration. The brute force approach includes:

1. For each beam angle that the equipment should support
   a. Derive ideal, non-discretized phase settings for each antenna element in the array
   b. For first group, sweep a group common phase θ_c1 over [0,180] deg.
      i. Add θ_c1 to ideal phase settings and then discretize to {0,180} deg.
      ii. Calculate group antenna gain (or other optimization metric) for each θ_c1 (assuming that added common phase is subtracted by phase shifter).
      iii. Find highest group antenna gain (or best other optimization metric*) and store the associated common phase value (θ_(c1,opt)) and discretized phases.
   c. For second group, repeat as for first group with a swept group common phase θ_c2.
   d. Set $\theta_1 = -\theta_{c1,opt}$ and $\theta_2 = -\theta_{c2,opt}$, to compensate for the optimal common phases determined in (b) and (c).

While the group antenna gain may be one of the most important parameters to optimize, there may be other metrics in addition, or in the alternative, against which the optimization is performed. For example, the foregoing optimization may be reworked to optimize sidelobe levels in relation to the main lobe, or to optimize the position of the side lobes.

Further, the above procedure can be generalized to any number of antenna element groups 24. Further, the above procedure can be repeated for every group configuration that is supported. For the above optimization scheme and with respect to the example group configurations 1-4 shown in FIG. 9, FIGS. 10-13 are plots of array gain relative to the ideal array gain. As seen, the worst-case gain loss is about 3.5 dB within one group configuration. That is for some worst-case beam directions the array gain is 3.5 dB less than with ideal phase control. In some best-case directions, on the other hand, the array gain is degraded very little or not at all. The worst-case and best-case directions are different for different group configurations.

Thus, to obtain the lowest possible loss in many different beam directions it is desirable to support a large number of group configurations. It is understood that there are limitations to what extent (with regards to the number of antenna elements 12) this can be supported if operating at very high frequencies. However, if the signal combining (or splitting) from branch signals 18 into group signals 22 is performed at an intermediate (IF) frequency or even at baseband, larger sets of group configurations can be supported.

Finally, the target for the proposed technique is that sufficient array gain is obtained in the direction of the desired received signal (or desired transmit signal) while the spatial selectivity in other directions (side lobes) is secondary. This may foremost be applicable to communication apparatus operating with a frequency range 100 GHz and higher.

Consider a broad formulation of receive-beamforming operations for a beamforming apparatus 10 that uses sign reversal circuits 16 to discretize the per branch phase values that would conventionally be used for beamforming via an array of antenna elements 12. As a first step and for any given beam angle to be realized, an optimal configuration of per-branch phases is found that maximizes the power of the group signal 22 from each antenna element group 24. In a second step, the group signals 22 from the respective antenna element groups 24 are combined, where at least one of the group signals 22 is phase shifted before combining, to maximize the power of the resulting overall signal 28. Notably, the antenna elements 12 can be regrouped depending on beam-angle, to improve performance further. That is, different beam angles may use different sizes and/or memberships for the antenna element groups 24.

The grouping of antenna elements 12 into an antenna element group 24 does not necessarily depend on the spatial relationships between the antenna elements 12, e.g., they are not necessarily all neighboring antenna elements 12 within a one-dimensional or two-dimensional array of antenna elements 12. Furthermore, as pointed out earlier, the phase shifting and signal combining can be performed directly at RF, at some IF, or even at baseband. For the two latter, it is understood that the receive paths of the branch circuits 14 also include frequency down-conversion from RF to the targeted IF frequency or baseband, before phase shifting and combining. A similar reasoning applies for a transmit configuration, and it should be understood that in one or more embodiments, the branch circuits 14 have both transmit and receive paths and support both receive beamforming and transmit beamforming, under control of the control circuitry 26.

Figure 14:
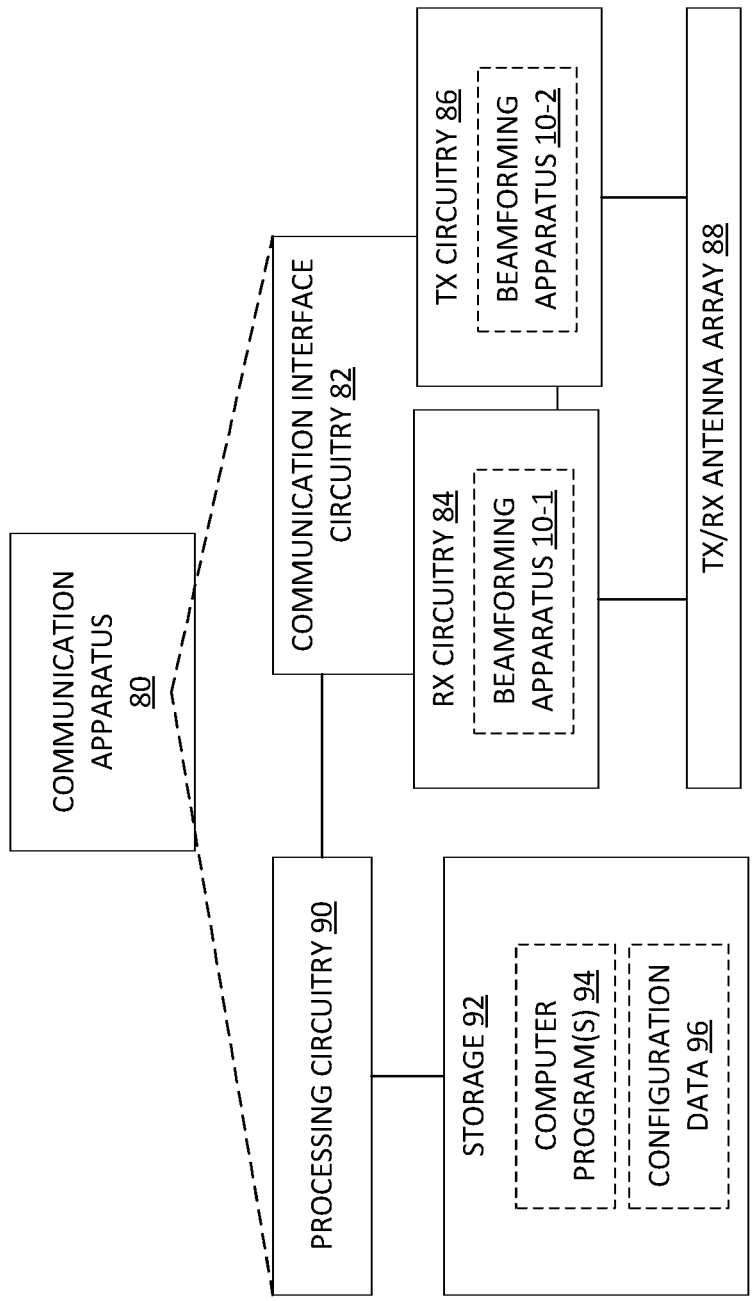
FIG. 14 is a block diagram of one embodiment of a communication apparatus.

FIG. 14 illustrates a communication apparatus 80 according to an example embodiment. For example, the communication apparatus 80 comprises a User Equipment (UE) configured for accessing a wireless communication network or comprises a radio network node providing access in such a network. The term "wireless communication device" may be used interchangeably with the terms "User Equipment" and "UE".

Example implementation details of the communication apparatus 80 include communication interface circuitry 82 comprising radio frequency receiver (RX) circuitry 84 and transmit (TX) circuitry 86. The receiver circuitry 84 may include a beamforming apparatus 10-1 for receive beamforming via a transmit/receive antenna array 88 and/or the transmit circuitry 86 may include a beamforming apparatus 10-2 for transmit beamforming via the transmit/receive antenna array 88. That is, the communication apparatus 80 may apply receive beamforming to wireless communication signals received by the apparatus 80 and/or may apply transmit beamforming to wireless communication signals transmitted by the apparatus 80. While shown as separate beamformers 10-1 and 10-2 for receive and transmit beamforming, respectively, the beamformers 10-1 and 10-2 may share common elements, e.g., common control circuitry 26, etc.

In one or more embodiments of the communication apparatus 80, the beamformers 10-1 and 10-2 are integrated together as one beamforming apparatus 10 having both receive beamforming and transmit beamforming capabilities. In such implementations, the branch circuits 14 of the beamforming apparatus 10 may include a pair of receiver branch circuits and transmitter branch circuits for each antenna element 12, along with combiners for combining receiver branch signals into group signals 22 for reception beamforming and splitters for splitting groups signals 22 into branch signals 18 for transmission beamforming. However, one or more elements within the branch circuits 14 may be bi-directional or otherwise usable for both the transmit (TX) and receive (RX) directions. Thus, in a Time-Division Duplex (TDD) scenario where TX and RX operations occur at different times, one or more elements in a respective branch circuit 14, such as a splitters/combiners, reversal circuits, etc., may be shared between TX and RX. Refer back to FIG. 2 for an example configuration for reception beamforming and FIG. 3 for an example configuration for transmission beamforming.

The communication apparatus 80 further includes processing circuitry 90, which may be fixed or dedicated processing circuitry or may be programmatically-configured processing circuitry or may be a mix of fixed and programmatically-configured processing circuitry. Examples of the processing circuitry 90 include one or more microprocessors, Digital Signal Processors (DSPs), Field Programmable Gate Arrays (FPGAs), one or more Application Specific Integrated Circuits (ASICs), or other digital processing circuitry.

In at least one embodiment, the processing circuitry 90 is realized at least in part based on the execution of computer program instruction via one or more microprocessors or other digital processing circuitry. That is, the microprocessor(s) or other digital processing circuitry is specially adapted according to the execution of computer program instructions. Correspondingly, in at least one embodiment, the communication apparatus 80 includes storage 92 that stores one or more computer programs 94 comprising such instructions. The storage 92 may further store configuration data 96, such as the stored sets of control values for the beamforming apparatus 10-1/10-2, for effectuating one or more desired beams for transmission beamforming and/or reception beamforming.

To that end, the processing circuitry 90 may be understood as providing processing resources for the communication interface circuitry 82, including providing control for the beamforming apparatus 10-1 for reception beamforming via the receiver circuitry 84 and for the beamforming apparatus 10-2 for transmission beamforming via the transmitter circuitry 86. In this regard, the processing circuitry 90 may include baseband processing for radio communications going between the communication apparatus 80 and another external apparatus, and may include additional processors or processing resources for supporting other functions of the communication apparatus 80, such as overall control of the apparatus, execution of higher-level applications, etc.

The storage 92 comprises one or more types of computer-readable media, with non-limiting examples including any one or more of certain memory or storage devices such as SRAM, DRAM, NVRAM, FLASH, EEPROM, Solid State Disk (SSD), magnetic disk, etc. The storage 92 in one or more embodiments comprises a mix of volatile memory, e.g., for program execution and live data processing, and non-voltage memory or storage for longer-term storage, e.g., of the computer program(s) 94 and configuration data 96.

Figure 15:
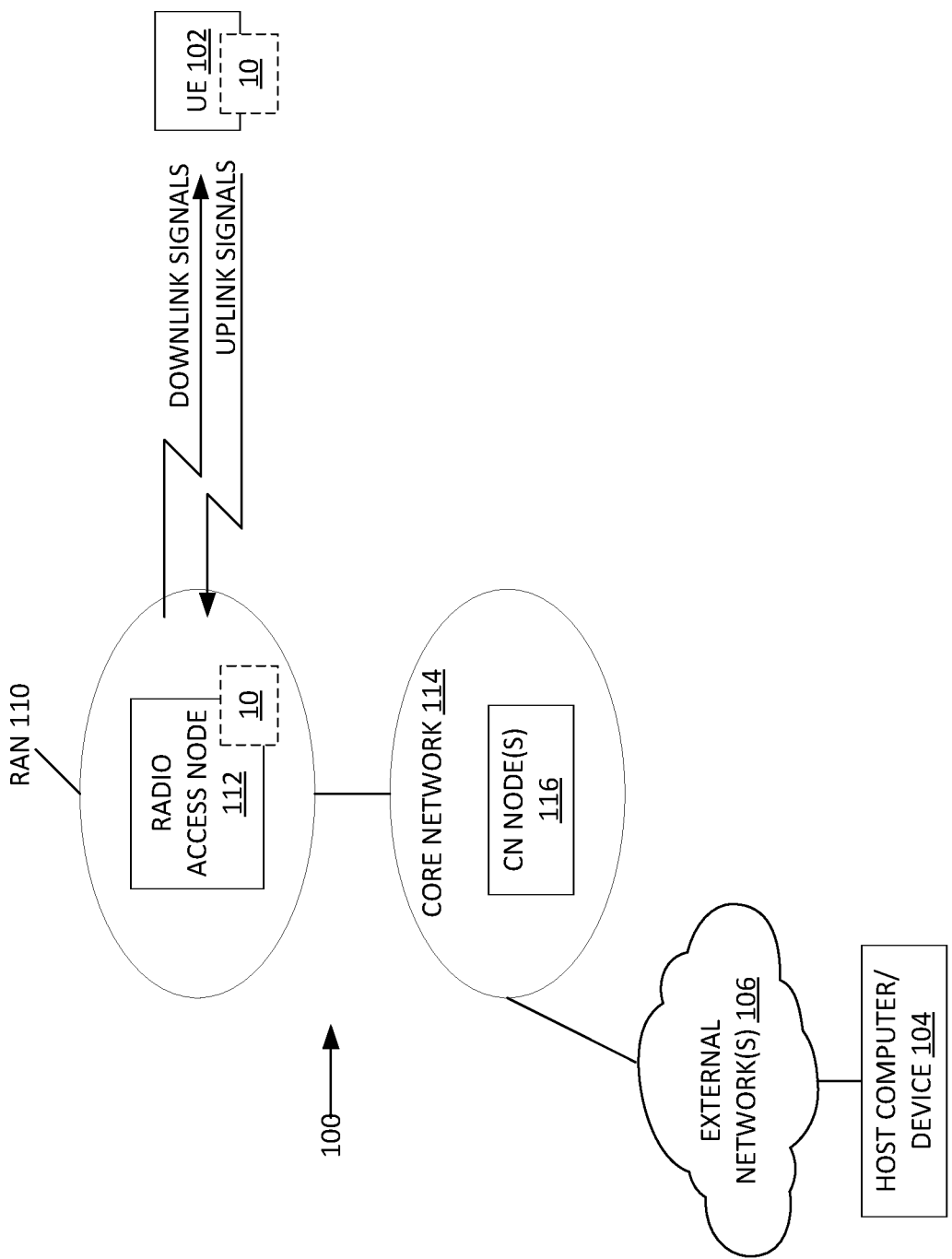
FIG. 15 is a block diagram of one embodiment of a wireless communication network.

FIG. 15 illustrates a wireless communication network 100 according to an example embodiment, where the network 100 comprises a communication network implemented according to standards promulgated by the Third Generation Partnership Project (3GPP). As a particular non-limiting example, the network 100 may be configured as a Fifth Generation (5G) New Radio (NR) network. More generally, the network 100 uses radio signals in one or more GHz frequency bands, for downlink transmission to User Equipments (UEs) 102 served by the network 100 and for uplink reception from the UEs 102.

Although only one UE 102 appears in the diagram, the network 100 may serve a potentially large number of UEs 102, of potentially many different types—e.g., mobile broadband devices associated with human users, Internet-of-Things (IoT) or Machine Type Communication (MTC) devices associated with various Machine-to-Machine (M2M) systems, such as smart metering, factory control, security, Vehicle-to-Vehicle (V2V) or Vehicle-to-Everything (V2X) systems, etc.

As such, the term "UE" has broad meaning but generally denotes equipment that uses the network 100 as an access network for one or more communication functions, rather than equipment constituting fixed or dedicated parts of the network 100. The communication apparatus 80 of FIG. 14, or a variation thereof, may be configured for operation as the UE 102.

The network 100 provides access to one or more communication services, such as by communicatively coupling UEs 102 to a host computer or device 104 that is accessible via an external network 106, such as the Internet or another Packet Data Network (PDN). Of course, there may be many external host computers (e.g., servers) offering any number of third-party communication services that are accessed by given UEs 102 via the network 100.

The network 100 includes a Radio Access Network (RAN) 110 that includes one or more radio access nodes 112, which may be referred to as access points, transmission-reception points, base stations, etc. Although only one radio access node 112 appears in the diagram, the RAN 110 may include many radio access nodes 112 that are geographically distributed to provide overlapping radio-signal coverage. In this regard, the network 100 provides an "air interface" via the radio network node(s) 112 for communicatively coupling with UEs 102, where the term "air interface" refers to the particular radio signal frequencies, signal structure, and timing used for conveying data and control signaling between the network 100 and the UEs 102 served by it.

The radio access nodes 112 may be of the same type or may be of different types, e.g., a mix of macro-coverage area base stations and pico-coverage area base stations, and the RAN 110 may support more than one type of Radio Access Technology (RAT). The communication apparatus 80 of FIG. 14, or a variation thereof, may be configured for operation as the radio access node 112.

Further included in the network 100, a core network (CN) 114 includes various CN nodes 116, e.g., for routing data from the external network(s) 106 to the targeted UEs 102 via the RAN 110 and vice versa, authentication and access control for limiting and controlling access to the network 100 by individual UEs 102, mobility management of UEs 102 as they move between different coverage areas of the network 100, etc.

With the use of higher frequency bands for the radio communication signals going between the RAN 110 and the UEs 102 served by the network 100, embodiments of the beamforming apparatus 10 contemplated herein may be implemented in the radio access nodes 112 or in the UEs 102 or in both. The diagram suggests these possibilities by depicting a beamforming arrangement 10 implemented at the radio access node 112 for transmission beamforming on the downlink and/or reception beamforming on the uplink, and further depicting another beamforming arrangement 10 implemented at the UE 102, for transmission beamforming on the uplink and/or reception beamforming on the downlink. It will be appreciated that the implementation details of the beamforming apparatus 10 may vary as between implementation at a radio access node 112 versus implementation at a UE 102. For example, the number of antenna elements may vary, along with differences in operating power, available physical space, etc.

With such details in mind and with reference to both FIGS. 1 and 14, a communication apparatus 80 is configured for operation in a wireless communication network and comprises communication interface circuitry 82 that is configured to transmit and receive radio signals according to the air interface used by the network. Further, the communication apparatus 80 includes processing circuitry that is operatively associated with the communication interface circuitry 82 and configured to control receive beamforming and/or transmit beamforming carried out by one or more beamforming apparatus 10 included in the communication interface circuitry 82.

The one or more beamforming apparatus 10 included in the communication interface circuitry 82 of the communication apparatus 80 include a plurality of branch circuits 14. Each branch circuit 14 is associated with a respective one of the antenna elements included in an antenna array 88 included in or associated with the communication apparatus 80, and includes a sign reversal circuit 16 that is controllable to reverse or not reverse the polarity of a branch signal 18 conveyed by the branch circuit 14.

The one or more beamforming apparatus 10 further include one or more phase shifters 20 controllable to impart a differential phase shift between two or more group signals 22 comprising at least first and second group signals 22-1, 22-2. Each group signal 22 corresponds to a respective antenna element group 24 within the antenna array 88 and is combined from or split into the branch circuits 14 associated with the respective antenna element group 24. Still further, the one or more beamforming apparatus 10 includes control circuitry 26—e.g., at least a portion of the processing circuitry 90—that is configured to perform the beamforming by controlling the one or more phase shifters 20 jointly with controlling the sign reversal circuits 16 in the branch circuits 14 associated with the respective antenna element groups 24. Again, the one or more beamforming apparatus 10 may be a single beamforming apparatus 10 that integrates both transmit and receive beamforming or may be separate beamforming apparatus for receive beamforming and/or transmit beamforming.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A beamforming apparatus configured for beamforming of radio signals using a plurality of antenna elements and comprising:
   a plurality of branch circuits, each branch circuit associated with a respective one of the antenna elements and including a sign reversal circuit that is controllable to reverse or not reverse a polarity of a branch signal conveyed by the branch circuit;
   one or more phase shifters controllable to impart a differential phase shift between two or more group signals comprising at least first and second group signals, each group signal corresponding to a respective antenna element group within the plurality of antenna elements and being combined from or split into the branch circuits associated with the respective antenna element group; and
   control circuitry configured to perform the beamforming by controlling the one or more phase shifters jointly with controlling the sign reversal circuits in the branch circuits associated with the respective antenna element groups,
   wherein, for any defined beam direction and/or beam shape to be effectuated, the control circuitry is configured to control any one or more of: a group configuration of any one or more of the respective antenna element groups; settings for the sign reversal circuits; and settings for the one or more phase shifters.

2. The beamforming apparatus of claim 1, wherein the beamforming apparatus stores predetermined control settings for the sign reversal circuits and the one or more phase shift circuits, for each of one or more beam directions and/or beam shapes to be effectuated.

3. The beamforming apparatus of claim 1, wherein the respective antenna element groups are disjoint subsets in the plurality of antenna elements.

4. The beamforming apparatus of claim 1, wherein the control circuitry is configured to form the respective antenna element groups dynamically.

5. The beamforming apparatus of claim 1, wherein each of the one or more phase shifters comprises digital circuitry operating on one or more of the group signals in a digital domain.

6. The beamforming apparatus of claim 1, wherein, for a particular beam direction to be effectuated, there exists a set of ideal phase shifts corresponding to branch signals associated with the respective antenna element groups, and wherein the control settings used by the control circuitry for the sign reversal circuits in the associated branch circuits approximate the ideal phase shifts by, for each respective antenna element group, controlling the sign reversal circuit in each associated branch circuit to reverse or not reverse the polarity of the associated branch signal in dependence on a value of the corresponding ideal phase shift, as adjusted by a common phase shift that reduces an error associated with the approximation.

7. The beamforming apparatus of claim 6, wherein, for each respective antenna element group, the control circuitry determines whether to reverse or not reverse the polarity of each associated branch signal according to a value of a discretized phase shift $\varphi n$, where $$\varphi_n = 180 \cdot \left\lfloor \frac{(\varphi_{n,ideal} + \theta_c + 90) \bmod 360}{180} \right\rfloor,$$

where n denotes the n-th branch circuit of the respective antenna element group, $\varphi_{n,ideal}$ is the ideal phase shift for the n-th branch circuit, $\theta_c$ is a group-specific common phase shift and $$\left\lfloor \frac{(\varphi_{n,ideal} + \theta_c + 90) \bmod 360}{180} \right\rfloor$$

equals 0 or 1 in dependence on the value of the ideal phase shift $\varphi_{n,ideal}$.

8. The beamforming apparatus of claim 6, wherein the control circuitry is further configured to control the one or more phase shifters to compensate for a reduced antenna array gain arising from the approximation.

9. The beamforming apparatus of claim 1, wherein each branch circuit is a differential branch circuit having complementary positive and negative signal paths and corresponding positive and negative path connections, and wherein the sign reversal circuit of each branch circuit comprises a set of switches that are controllable to reverse the polarity of the corresponding branch signal by reversing connectivity between the positive and negative path connections with respect to the positive and negative signal paths.

10. The beamforming apparatus of claim 1, wherein, in a case of receive beamforming by the beamforming apparatus, each group signal corresponds to a combination of branch signals from the respective antenna element group, and wherein, in a case of transmit beamforming by the beamforming apparatus, each group signal is split to form the branch signals for the respective antenna element group.

11. A method of beamforming radio signals using a plurality of antenna elements, the method comprising:
   operating the plurality of antenna elements as two or more antenna element groups, with each antenna element group having a corresponding group signal that is combined from or split into a plurality of branch circuits associated with the corresponding antenna element group, each branch circuit corresponding to a respective one of the antenna elements and including a sign reversal circuit that is controllable to reverse or not reverse a polarity of a branch signal conveyed by the branch circuit;
   said step of operating the plurality of antenna elements as two or more antenna element groups including controlling a differential phase shift between the group signals jointly with controlling the plurality of sign reversal circuits, to perform the beamforming; and
   for any defined beam direction and/or beam shape to be effectuated, controlling any one or more of: a group configuration of any one or more of the respective antenna element groups; settings for the sign reversal circuits; and settings for the one or more phase shifters.

12. The method of claim 11, wherein the method further comprises using predetermined control settings for the sign reversal circuits and the one or more phase shifters that are operative to impart the differential phase shift between the group signals, for each of one or more beam directions to be effectuated.

13. The method of claim 11, wherein the respective antenna element groups are disjoint subsets in the plurality of antenna elements.

14. The method of claim 11, further comprising forming the respective antenna element groups dynamically.

15. The method of claim 11, wherein the method comprises applying the differential phase shift in a digital domain.

16. The method of claim 11, wherein, for a particular beam direction to be effectuated, there exists a set of ideal phase shifts corresponding to the branch circuits associated with the respective antenna element groups, and wherein controlling the differential phase shift between the group signals corresponding to the two or more antenna element groups jointly with controlling the sign reversal circuits comprises approximating the ideal phase shifts by, for each respective antenna element group, controlling the sign reversal circuit in each associated branch circuit to reverse or not reverse the polarity of the associated branch signal in dependence on a value of the corresponding ideal phase shift, as adjusted by a common phase shift that reduces an error associated with the approximation.

17. The method of claim 16, further comprising using one or more phase shifters that impart the differential phase shift between the group signals, to compensate for a reduced antenna array gain arising from the approximation.

18. The method of claim 16, wherein, for each respective antenna element group, the method includes determining whether to reverse or not reverse the sign of each associated branch signal according to a value of a discretized phase shift on, where $$\varphi_n = 180 \cdot \left\lfloor \frac{(\varphi_{n,ideal} + \theta_c + 90) \bmod 360}{180} \right\rfloor,$$

where n denotes the n-th branch circuit of the respective antenna element group, $\varphi_{n,ideal}$ is the ideal phase shift for the n-th branch circuit, $\theta_c$ is a group-specific common phase shift and $$\left\lfloor \frac{(\varphi_{n,ideal} + \theta_c + 90) \bmod 360}{180} \right\rfloor$$

equals 0 or 1 in dependence on the value of the ideal phase shift $\varphi_{n,ideal}$.

19. The method of claim 11, wherein each branch circuit is a differential branch circuit having complementary positive and negative signal paths and corresponding positive and negative path connections, wherein the sign reversal circuit of each branch circuit comprises a set of switches that are controllable to reverse the polarity of the corresponding branch signal by reversing connectivity between the positive and negative path connections with respect to the positive and negative signal paths, and wherein controlling the plurality of sign reversal circuits comprises controlling the sets of switches.

20. The method of claim 11, wherein, in a case of receive beamforming by the beamforming apparatus, each group signal corresponds to a combination of branch signals from the respective antenna element group, and wherein, in a case of transmit beamforming by the beamforming apparatus, each group signal is split to form the branch signals for the respective antenna element group.

21. A communication apparatus comprising:
   communication interface circuitry configured for transmitting and receiving wireless communication signals;
   wherein the communication interface circuitry includes a beamforming apparatus configured for beamforming of radio signals using a plurality of antenna elements and comprising:
      a plurality of branch circuits, each branch circuit associated with a respective one of the antenna elements and including a sign reversal circuit that is controllable to reverse or not reverse a polarity of a branch signal conveyed by the branch circuit;
      one or more phase shifters controllable to impart a differential phase shift between two or more group signals comprising at least first and second group signals, each group signal corresponding to a respective antenna element group within the plurality of antenna elements and being combined from or split into the branch circuits associated with the respective antenna element group; and
      control circuitry configured to perform the beamforming by controlling the one or more phase shifters jointly with controlling the sign reversal circuits in the branch circuits associated with the respective antenna element groups, wherein, for any defined beam direction and/or beam shape to be effectuated, the control circuitry is configured to control any one or more of: a group configuration of any one or more of the respective antenna element groups; settings for the sign reversal circuits; and settings for the one or more phase shifters.

22. The communication apparatus of claim 21, wherein the communication apparatus comprises a User Equipment (UE) that is configured for accessing a wireless communication network, including receiving downlink wireless communication signals transmitted by one or more radio network nodes of the wireless communication network and transmitting uplink wireless communication signals for one or more radio network nodes of the wireless communication network.

23. The communication apparatus of claim 21, wherein the communication apparatus comprises a radio network node that is configured for operation in a wireless communication network, including transmitting downlink wireless communication signals for one or more User Equipments (UEs) and receiving uplink wireless communication signals from one or more UEs.

\* \* \* \* \*